(12) United States Patent
Hardacker

(10) Patent No.: US 7,733,287 B2
(45) Date of Patent: Jun. 8, 2010

(54) SYSTEMS AND METHODS FOR HIGH FREQUENCY PARALLEL TRANSMISSIONS

(75) Inventor: Robert Hardacker, Escondido, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 444 days.

(21) Appl. No.: 11/416,857

(22) Filed: May 2, 2006

(65) Prior Publication Data

US 2007/0024506 A1 Feb. 1, 2007

Related U.S. Application Data

(60) Provisional application No. 60/704,179, filed on Jul. 29, 2005.

(51) Int. Cl.
*H01Q 21/08* (2006.01)
(52) U.S. Cl. ..................................................... 343/824
(58) Field of Classification Search ................. 343/824, 343/700 MS, 702, 795, 786; 455/178.1
See application file for complete search history.

(56) References Cited

U.S. PATENT DOCUMENTS

| | | | | |
|---|---|---|---|---|
| 2,418,124 | A * | 4/1947 | Kandoian | 342/371 |
| 4,933,679 | A * | 6/1990 | Khronopulo et al. | 343/700 MS |
| 5,523,764 | A | 6/1996 | Martinez et al. | |
| 6,268,781 | B1 * | 7/2001 | Schaffner | 333/26 |
| 6,445,346 | B2 * | 9/2002 | Fathy et al. | 343/700 MS |
| 6,529,166 | B2 * | 3/2003 | Kanamaluru | 343/700 MS |
| 6,870,503 | B2 | 3/2005 | Mohamadi | |
| 6,876,336 | B2 * | 4/2005 | Croswell et al. | 343/795 |
| 6,947,008 | B2 * | 9/2005 | Tillery et al. | 343/824 |
| 7,126,554 | B2 * | 10/2006 | Mohamadi | 343/772 |
| 7,292,831 | B2 * | 11/2007 | Shoji et al. | 455/178.1 |
| 7,365,699 | B2 * | 4/2008 | Grebel et al. | 343/810 |
| 7,379,515 | B2 * | 5/2008 | Johnson et al. | 375/347 |
| 7,417,440 | B2 * | 8/2008 | Peschmann et al. | 324/637 |
| 2004/0085250 | A1 * | 5/2004 | Tillery | 343/795 |
| 2006/0001572 | A1 * | 1/2006 | Gaucher et al. | 343/701 |
| 2008/0174510 | A1 * | 7/2008 | Cassen et al. | 343/872 |

OTHER PUBLICATIONS

Alalusi presentation titled "A 60GHz Antenna Array Front-End in CMOS for Gigabit-per-second Indoor Mobile Applications" and located at the website http://bwrc.eecs.berkeley.edu/seminars/Seminars_Archive/Alalusi%20-3.21.03/Antenna%20Array%20Alalusi.ppt.*
Antenna array Website http://www.analyzemath.com/antenna_tutorials/antenna_arrays.html.*
Dietrich, Jr. (Adaptive Arrays and Diversity Antenna Configurations for Handheld Wireless Communication Terminals; available at http://scholar.lib.vt.edu/theses/available/etd-04262000-15330030/unrestricted/).*
Dietrich, Jr. (Adaptive Arrays and Diversity Antenna Configurations for Handheld Wireless Communication Terminals; available at http://scholar.lib.vt.edu/theses/available/etd-04262000-15330030/unrestricted/).*

* cited by examiner

*Primary Examiner*—Huedung Mancuso
(74) *Attorney, Agent, or Firm*—Dickstein Shapiro LLP

(57) ABSTRACT

A plurality of high-frequency beam-forming RF antenna arrays are used to enable parallel data transmission at multi-Gigabit per second data rates. In one embodiment, the 60 GHz band is used for parallel transmission of data from an antenna array printed on the substrate or packaging of an integrated circuit.

25 Claims, 7 Drawing Sheets

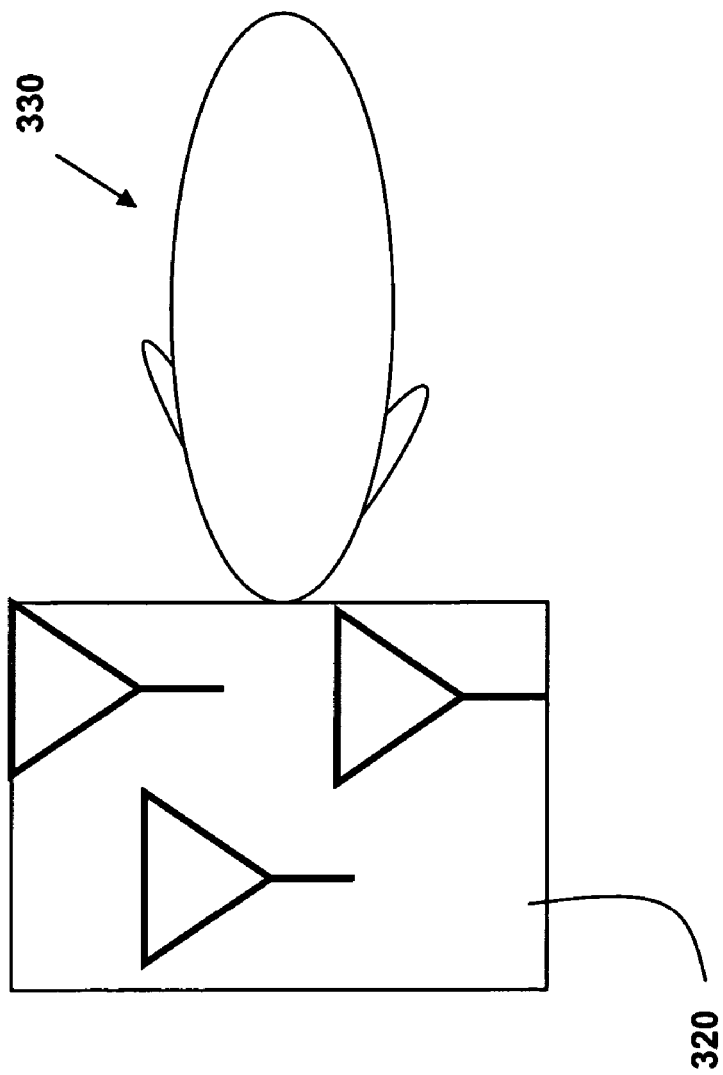

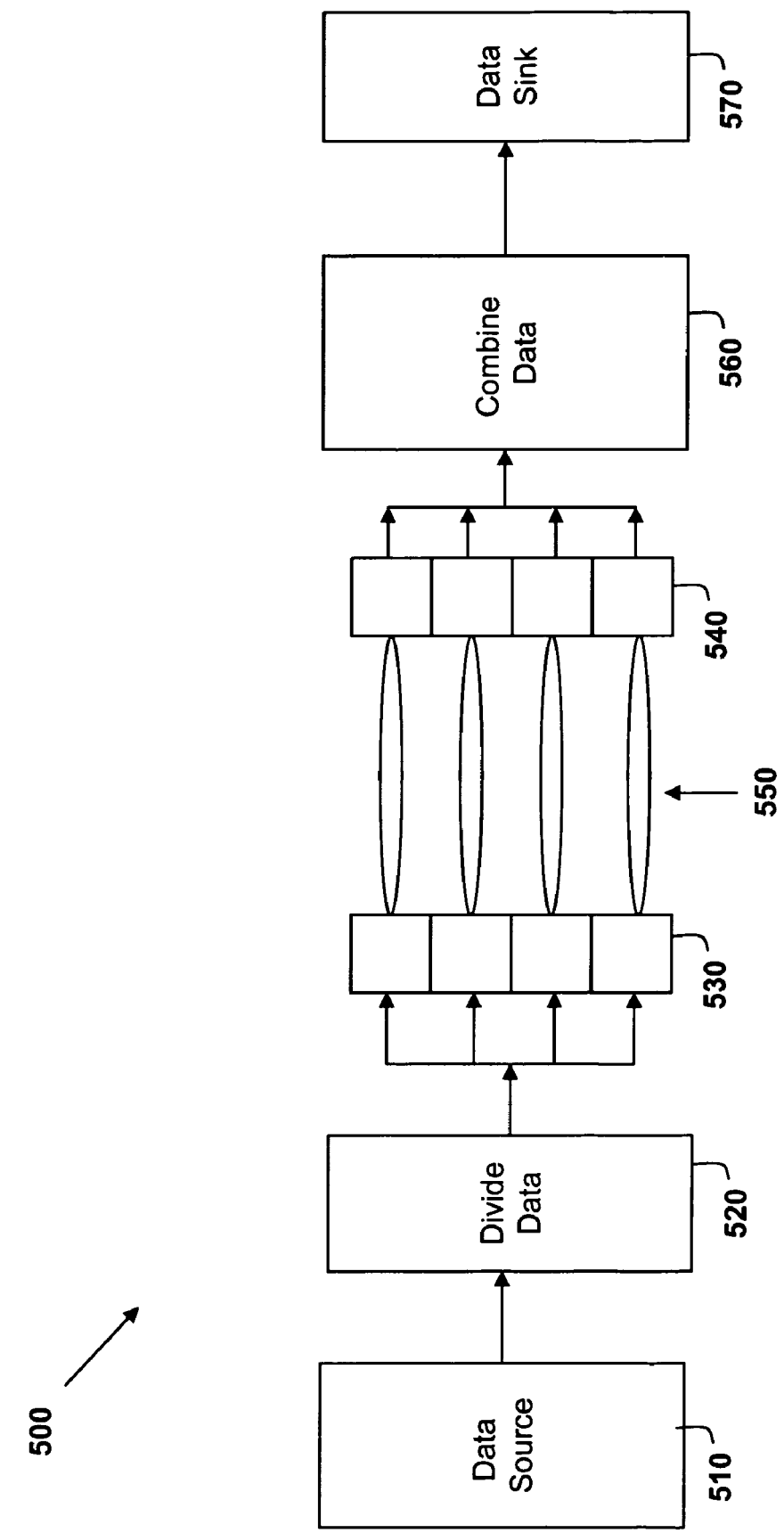

SYSTEMS AND METHODS FOR HIGH FREQUENCY PARALLEL TRANSMISSIONS

CROSS REFERENCE TO RELATED APPLICATIONS

This application is related to and claims priority from the U.S. provisional patent application having application No. 60/704,179, filed on Jul. 29, 2005.

1. FIELD OF THE INVENTION

The invention relates in general to systems and methods for wireless transmissions, and in particular to parallel transmissions at high carrier frequencies.

2. BACKGROUND

There has recently been a pronounced increase in the types of communication applications that require the use of wireless data transfer. Such applications include, for example, video conferencing, video-on-demand, high speed Internet access, high speed local area networks, online gaming, and high definition television. In the home or office, for example, computing devices continue to be connected using wireless networking systems. Many additional types of devices are also being designed with wireless communication in mind.

At frequencies below about 3 GHz, signals tend to be less directional, thereby causing them to impact and reflect off of nearby objects. These reflected signals result in what is known as "multipath," which involves the reflected signal arriving at the intended receiver later than the original signal. One way to minimize this effect has been to parcel the frequency spectrum by licensing a given spectrum band to a single signal provider in a given area.

At higher frequencies (e.g. from about 3 to about 60 GHz), signals become somewhat directional, which largely reduces the multipath issue mentioned above. As such, the number of signal providers that can coexist in a given space and/or frequency increases dramatically. The 57-64 GHz ("60 GHz band") band is located in the millimeter-wave portion of the electromagnetic spectrum and has been largely unexploited for commercial wireless applications. This spectrum is unlicensed by the FCC in the United States and by other bodies world-wide. In addition to the higher-data rates that can be accomplished in this spectrum, energy propagation in the 60 GHz band has unique characteristics that make possible many other benefits such as excellent immunity to interference, high security, and frequency re-use.

Transmissions at 60 GHz can be much more directional in nature, and can co-exist with other signal sources placed in very close proximity to each other. Directivity is a measure of how well an antenna focuses its energy in an intended direction. Highly focused antennas minimize the possibility of interference between links in the same geographic area, minimize the risk that the transmission will be intercepted, and maximize performance by only expending energy in the intended direction.

Low power transmissions (i.e. lower than the FCC allowed 40 dBm) in the 60 GHz range are limited in range in both free air, attributable to oxygen absorption of the energy, and is easily stopped or reflected by structures such as walls. These seeming limitations contribute to the inherent security of the transmissions.

Omni-directional transmissions are useful in point to multi-point transmissions, but are energy wasteful in the case of point to point transmissions. Focused, or directional, transmitters of the same power as an omni-directional transmission will far exceed the range of the omni-transmitter OR if the same range is desired, then the focused transmitter will use significantly less power. The focused transmitters enable like-frequency focused transmitters to co-exist in closer proximity than omni-directional transmitters. By placing multiple directional transmitters in parallel the data rate capability is multiplied by the number of transmitters. Data rates are directly related to available bandwidth and signal-to-noise (SNR) in the bandwidth. The available SNR & bandwidth dictate modulation schemes, which in turn affects bits per symbol. For example, 1 GHz of bandwidth using a simple, robust DQPSK modulation scheme (2 bits per symbol) yields 2 Giga bits per second (Gbps). To achieve more bits per symbol requires a quieter data channel as well as more sophisticated modulators and demodulators. In the case of 60 GHz where data rates easily exceed 2 Gbps this results in extraordinarily high data rates across relatively short ranges.

One method to focus or direct the transmission is to use a "horn" antenna, but these are expensive, large, and fixed in terms of direction and focus. There is still a need for more directed transmissions than what is possible with typical 60 GHz transmissions, and for higher-data rate transmissions. Thus, there exists a need for a system and method for high frequency parallel RF transmissions that overcomes the aforementioned problem, while still maintaining the benefits of 60 GHz transmissions.

BRIEF SUMMARY OF THE INVENTION

Disclosed and claimed herein are systems and methods for high frequency parallel transmissions. In one embodiment, a transmitter includes a plurality of antenna arrays which each include a plurality of individual antennas. In one embodiment, the plurality of antenna arrays are configured to transmit radio frequency signals in parallel with each other at a frequency of between approximately 57 GHz and 95 GHz.

Other aspects, features, and techniques of the invention will be apparent to one skilled in the relevant art in view of the following detailed description of the invention.

BRIEF DESCRIPTION OF DRAWINGS

FIGS. 3B-3C are illustrations of other embodiments of antenna arrays and resulting signal patterns in accordance with the principles of the invention;

FIG. 5 is one embodiment of a communication system for carrying out one or more aspect of the invention.

DETAILED DESCRIPTION OF THE PREFERRED EMBODIMENT

Figure 1:
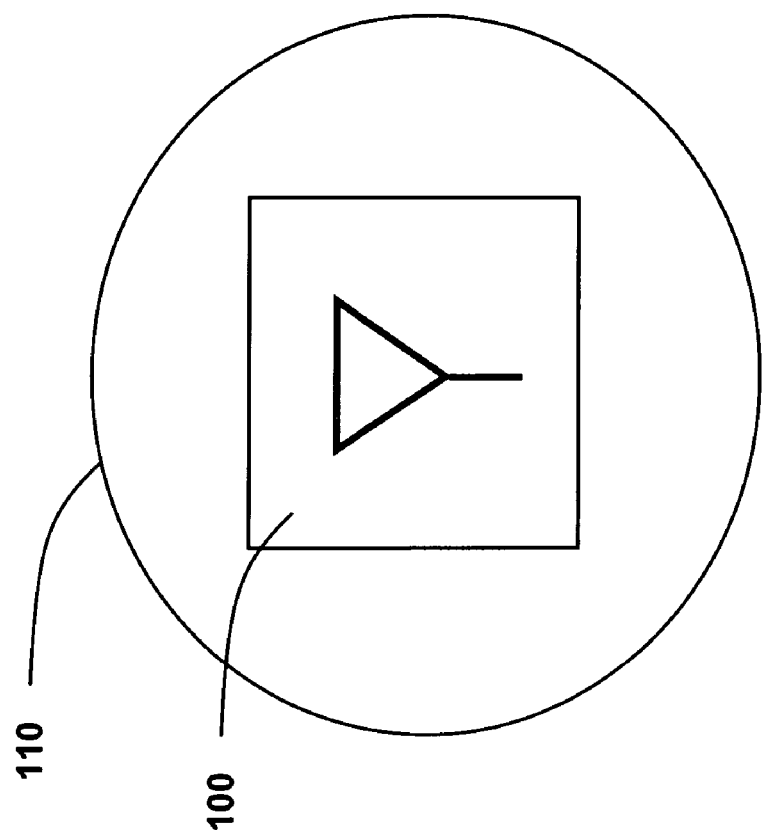
FIG. 1 is a typical antenna and its resulting omni-directional signal pattern.

One aspect of the invention is to provide a high-frequency RF antenna array for each transmitter. Through the use of appropriate signal processing interference between the individual antennas comprising the array is eliminated in favor of constructive interference that beams the resulting RF signal pattern. In one embodiment, the optimal frequency of the antenna array is in the 60 GHz band. In another embodiment, the optimal frequencies of the antenna array are between 57 GHz and 95 GHz. Regardless of frequency, in certain embodiments the individual antennas which comprise the array all are optimized to operate at approximately the same frequency and with a signal phase controlled by signal processing to enable the antennae to operate in conjunction with one another.

It should be appreciated that the beam-forming characteristics of an antenna array are based in part on both the physical antenna pattern comprising the array, as well as the physical pattern of the individual antennas. As such, numerous antenna configurations and array patterns would be consistent with the principles of the invention.

Another aspect is to enable a plurality of aforementioned beam-forming arrays to be used for parallel transmission. In one embodiment, this is done by forming a super-array comprised of a plurality of individual beam-forming arrays of high-frequency RF antennas. Parallel data transmission using such a super-array may be used to increase both transmission distance, as well as the data transmission rate. Individual point to point transmissions can easily achieve >2 Gbps at up to 20 meters at very low power (<10 dBm). In certain embodiments, the invention enables the parallel RF transmission of data in the 60 GHz band at multi-Gigabit per second (Gbps) data rates without the need to change frequency on the radio transmitters, thus contributing to a low cost implementation.

In one embodiment, parallel transmission is enabled by splitting or dividing an incoming data stream into multiple data streams and wirelessly broadcasting them in parallel from point-to-point. In another embodiment, a parallel incoming data stream is multiplexed into 1 or more serial streams which is then wirelessly broadcast point-to-point. In one embodiment, the transmission point is comprised of a super-array of individual beam-forming antenna arrays. The receiving point may be comprised of a corresponding series of receiving antennas, after which data stream can be recombined. In one embodiment the received data streams maybe demultiplexed, re-combined and re-aligned to a parallel data stream. In one embodiment, parallel transmission is enabled using 60 GHz band transmissions.

While in some embodiments, the super-array may be a one-dimensional array, in other embodiments it may be a two-dimensional array. The beam forming capacity of the array may be orthogonal to the plane of the array of the individual antennae.

It should be noted that beam-forming, whether in one-dimension or two-dimensions, need not be at right angles or orthogonal, respectively. In the case of a one-dimensional super-array, the beams formed minimize interference when parallel to one another. However, they need not be at right angles to the antennas that comprise the array. Rather, the beams can be at any angle to the array that can be achieved using, for example, antenna steering. In the case of two-dimensional arrays, the beams formed by the array need not be orthogonal to the plane in which the individual antennas reside.

Another aspect of the invention is to print an embodiment of the aforementioned super-array atop a substrate attached to an integrated circuit (IC) of a transmitter or receiver. While typically it would not be possible to mount multiple antennas on an IC due to the resulting interference and/or size issues discussed above, the directionality of high frequency transmission systems, such as in the 60 GHz band, enables the close placement of individual antennas without incurring the signal interference issues of the prior art. Given that antennae are typically sized at one-quarter wavelength (lambda/4) and multiple antennas can be placed at half-wavelengths apart (lambda/2), millimeter wavelength implementations allows antennas to be placed a few millimeters apart and many antennae can be place in an area of only a few millimeters squared. The exact spacing is determined by the frequency of the transmitter and the nature of the antennae employed.

Figure 2:
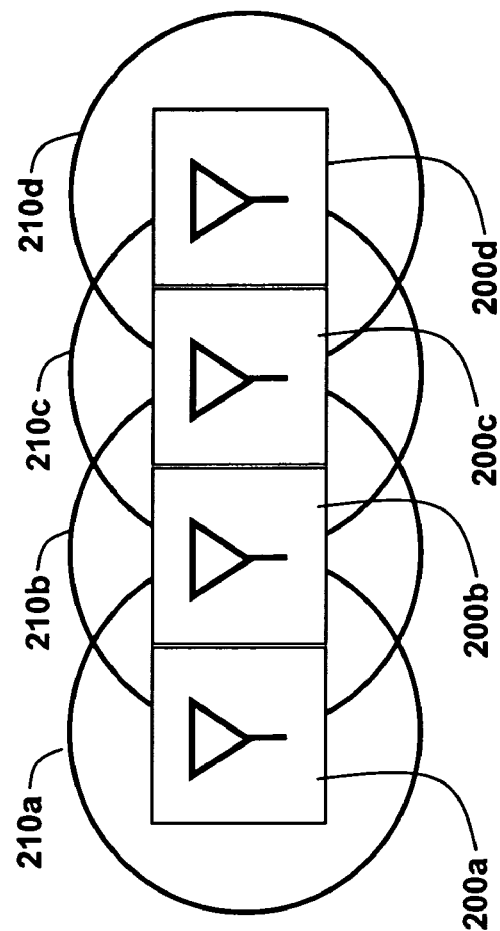
FIG. 2 is an array of typical antenna and their resulting omni-directional signal patterns.

FIG. 1 depicts a typical RF antenna 100 of the prior art and its resulting omni-directional signal pattern 110. As can be seen in FIG. 2, attempting to use an array of antennas 100 would cause large signal distortions and interferences due to their overlapping signal propagations.

For example, FIG. 2 depicts what the signal propagation of a series of omni-directional antennas 200a-200d were placed in parallel. Signal patterns 210a-210d would severely overlap, as shown in FIG. 2. One way this has been avoided by the prior art is for antennas 200a-200d each to transmit on different frequencies and/or vary the phase of the transmissions. However, each of these solutions result in higher costs of manufacture due to more complex hardware and/or software.

Figure 3A:
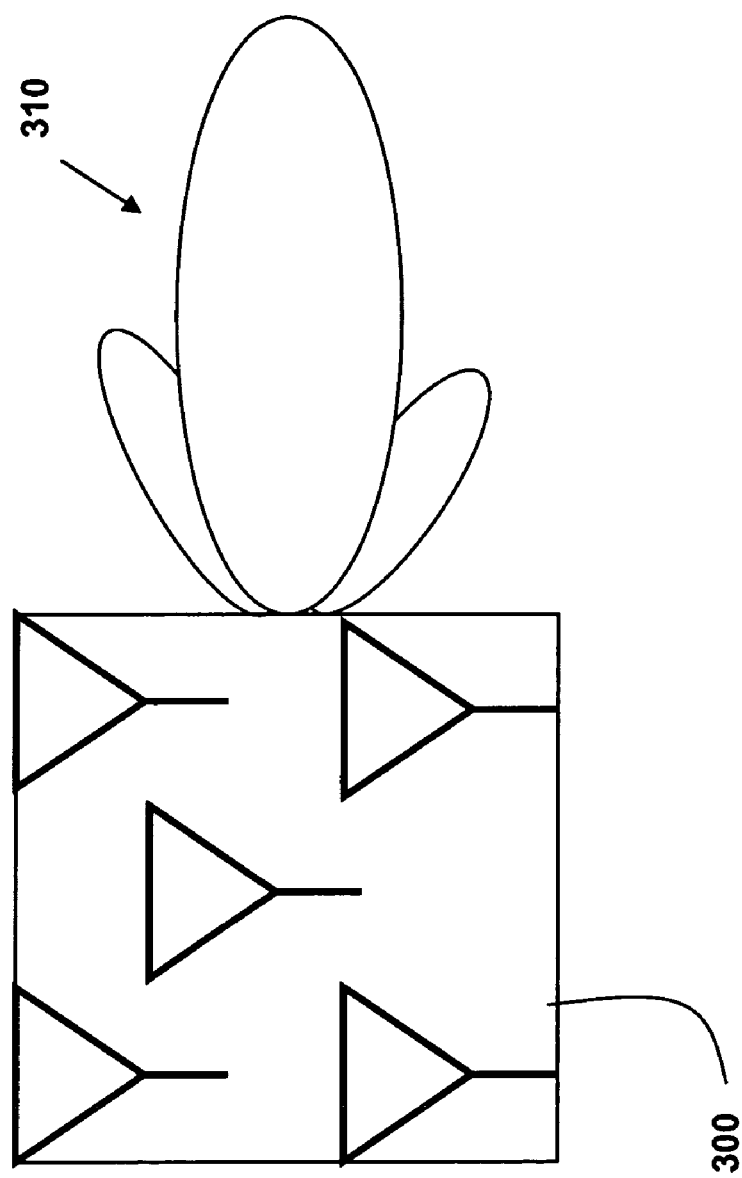
FIG. 3A is a depiction of an antenna array and resulting signal pattern according to one embodiment of the invention.

Referring now to FIG. 3A, depicted is one embodiment of a 60 GHz band antenna array 300 and its resulting signal pattern 310. Although the array 300 of FIG. 3A is shown as comprising five individual antennas, it should equally be appreciated that any other number of antennas greater than one may similarly be used to form array 300. In other embodiment, antenna array 300 may transmit at frequencies above the 60 GHz band, such as up to 95 GHz.

As shown in FIG. 3A, the orientation of high-frequency array 300 results in a beam-formed RF signal 310. At frequencies in or above the 60 GHz band, individual antennas may be placed close together due to the short wavelengths and subsequent antennae implementations to produce a directed beam minimal interference between the individual antennas. This is made possible by the fact that the shorter wavelength of higher frequency signals allows smaller antennas to be used. Directional signals reduce adjacent interferences, improve communication security, provide better QoS, have a higher bit-rate per area and are more energy efficient.

Continuing to refer to FIG. 3A, it should further be appreciated that beam-formed signal 310 may have other directionality than what is depicted in FIG. 3A based on the physical placement of the antennas which comprise array 300, as well as the physical patterns of the individual antennas themselves. Moreover, it should be appreciated that signal processing software may further be used to alter or modify the characteristics of beam-formed signal 310.

Figure 3C:
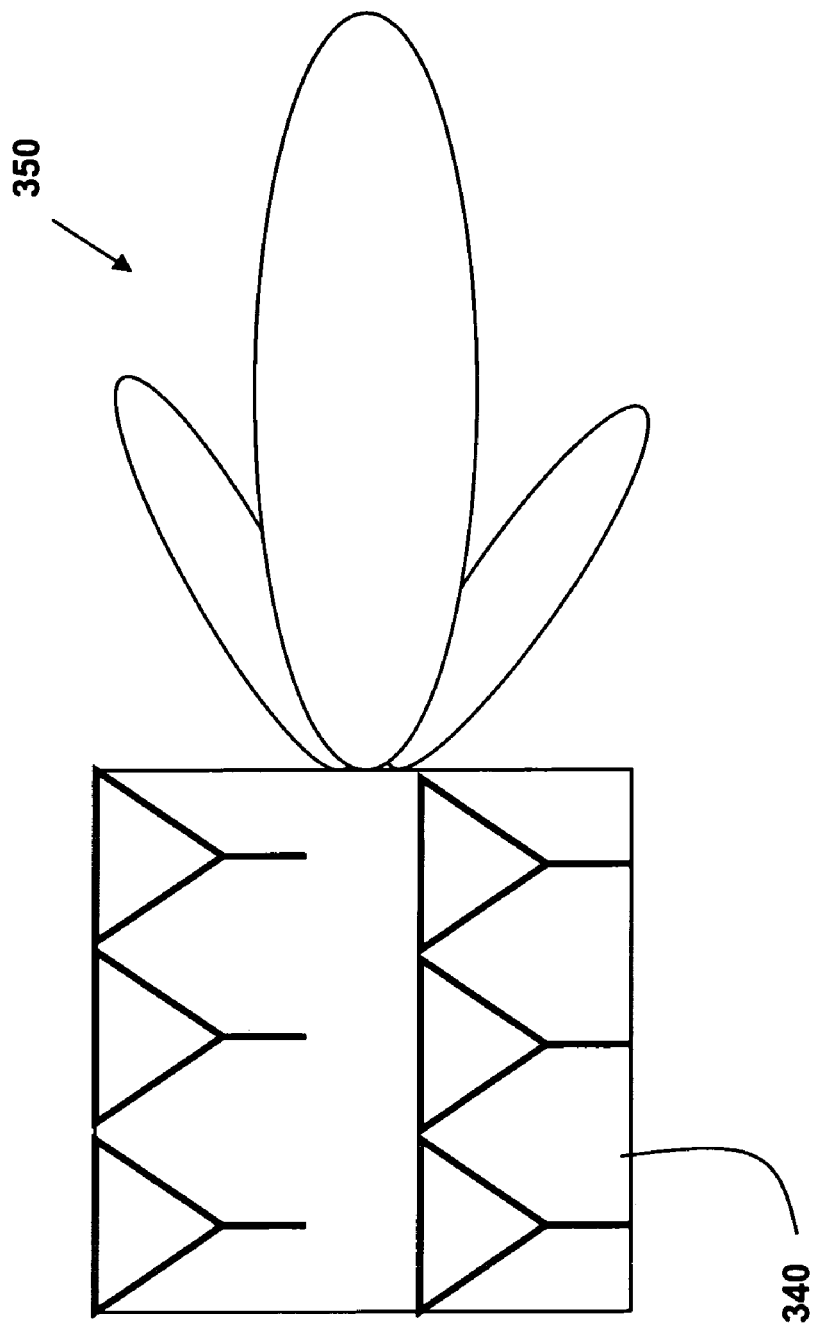

By way of illustrating the numerous possible configurations that array 300 may have, FIGS. 3B-3C depict additional embodiments thereof. In FIG. 3B, for example, high frequency RF antenna array 320 is depicted as being comprised of 3 separate individual antennas placed in close proximity to each other resulting in beam-formed signal 330. Similarly, FIG. 3C depicts a high frequency RF antenna array 340 as being comprised of 6 separate individual antennas placed in close proximity to each other resulting in beam-formed signal 340.

Figure 4:
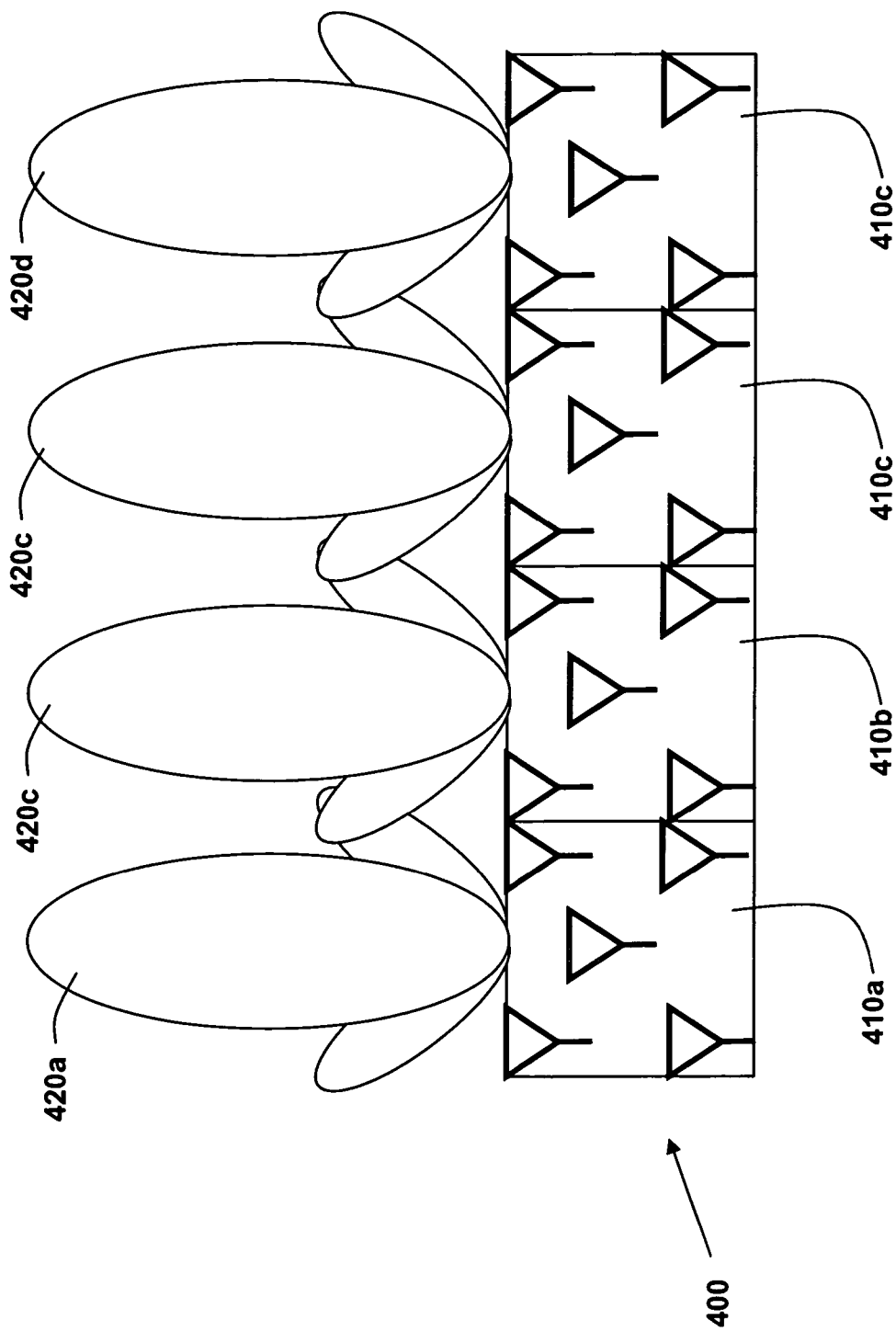
FIG. 4 illustrates one embodiment of a super-array comprised of four individual beam-forming arrays, each of which is comprised of a plurality of high-frequency RF antennas.

Referring now to FIG. 4, depicted is one embodiment of a super-array 400 comprised of four individual beam-forming arrays 410a-410d, each of which is comprised of a plurality of high-frequency RF antennas. As with the previous example, in one embodiment the individual antennas which comprise array 410a-410d may be placed within approximately ½ wavelengths to one another. It should also be appreciated that numerous other configurations of the individual antennas would be consistent with the principles of the invention.

As mentioned above, one aspect of the invention is to enable high-speed parallel data transmission using a super-array, such as super-array 400 to increase both transmission distance, as well as the data transmission rate. To that end, array 400 may be used to transmit beam-formed signals 420a-420d in the 60 GHz band. In one embodiment, the parallel transmission of signals 420a-420d is enabled by splitting or dividing an incoming data stream (not shown) into multiple data streams and wirelessly broadcasting them from super-array 400. While in the embodiment of FIG. 4, super-array 400 is a one-dimensional array, in other embodiments it may be a two-dimensional array. In one embodiment of FIG. 4, super-array 400 is imprinted on a substrate attached to an integrated circuit (IC) of a transmitter.

FIG. 5 illustrates a simplified schematic of a system 500 for carrying out on or more aspect of one embodiment of the invention. In this embodiment, a data source 500 provides a data stream to a data splitting module 520. In one embodiment, the data source is a high bit rate source, such as a high definition video source. It should be appreciated that data splitting module may be any combination of hardware and software capable of dividing an incoming data stream into separate data streams.

Once the data stream has been processed by module 520, it is provided to a transmitter array 530, as shown in FIG. 5. In one embodiment, transmitter array 530 is comprised of four individual beam-forming sub-arrays (e.g., arrays 410a-410d), each of which is in turn comprised of a plurality of high-frequency RF antennas. In one embodiment, four frequency-optimized individual antennas, each of a size of approximately ·/4, are spaced at distance of approximately ·/2 in an area the size of the wavelength, · squared which comprise the transmitter array 530. In certain embodiments, the transmitter array 530 may be printed on the substrate of an integrated circuit. It should also be appreciated that the transmitter array 530 may be comprised of greater or fewer sub-arrays.

Continuing to refer to FIG. 5, in one embodiment high-speed parallel data transmission is made possible by transmitting a high frequency signal 550 between the transmitter array 530 and a corresponding receiver array 540. While in one embodiment, signal 550 is in the 60 GHz band, it may similarly be in a higher frequency band as well (e.g., 57 GHz to 95 GHz). Once the transmission has been detected by receiver array 540, a series of device identification and compatibility "handshaking" may occur. In one embodiment, this compatibility check may include having the transmitter array 530 send out a high frequency signal containing a unique pattern of on/off values. Upon receiving this pattern, the receiver array 540 may then acknowledge signal. It should further be appreciated that numerous other procedures for establishing communication between the transmitter array 530 and receiver array 540 may be used. In certain embodiments, signal 550 may travel a distance of between a few millimeters to several meters, depending on power, modulation, antennae arrangement, signal processing, etc.

As with the transmitter array 530, the receiver array 540 may be comprised four individual beam-forming sub-arrays each of which is in turn comprised of a plurality of high-frequency RF antennas. In one embodiment, the individual antennas which comprise the receiver array 540 may be placed within in between about ½ wavelength each other. In certain embodiments, the receiver array 540 may be printed on the substrate of an integrated circuit. It should also be appreciated that the receiver array 540 may be comprised of greater or fewer sub-arrays.

At this point, the data stream can be recombined by module 560 and provided to a data sink 570, as shown in FIG. 5. While the data sink 570 can be any data destination, such as high definition television, computer hard drive, digital video recorder, PDA, DVD player, etc. In one embodiment, parallel transmission of signal 550 as depicted in FIG. 5 enables the transmission of multi-Gigabit per second data rates using 60 GHz band transmissions.

While the preceding description has been directed to particular embodiments, it is understood that those skilled in the art may conceive modifications and/or variations to the specific embodiments described herein. Any such modifications or variations which fall within the purview of this description are intended to be included herein as well. It is understood that the description herein is intended to be illustrative only and is not intended to limit the scope of the invention.

What is claimed is:

1. A transmitter comprising a plurality of antenna arrays each being comprised of a plurality of individual antennas, and wherein each of the plurality of individual antennas transmit radio frequency signals with a common phase and at a common frequency that is between approximately 57 GHz and 95 GHz, and wherein each of the plurality of antenna arrays is configured to transmit a plurality of different data streams in parallel with each other at said common frequency, wherein both of the plurality of individual antennas and the plurality of antenna arrays are arranged in particular physical patterns that impart beam-forming characteristics to minimize interference between the parallel plurality of different data streams.

2. The transmitter of claim 1, wherein said common frequency is in a 60 GHz band.

3. The transmitter of claim 1, wherein said plurality of antenna arrays are printed on a substrate of a circuit board.

4. The transmitter of claim 3, wherein said plurality of individual antennas that comprises the plurality of antenna arrays are printed on the substrate approximately ½ wavelengths apart.

5. The transmitter of claim 1, wherein the plurality of different data streams comprise a plurality of radio frequency signals that have been encoded with data that is different from each of the other plurality of different data streams.

6. A communication system comprising:
a plurality of antenna arrays to transmit radio frequency signals with a common phase and at a frequency of between approximately 57 GHz and 95 GHz, wherein each of the plurality of antenna arrays is comprised of a plurality of individual antennas configured in a pattern that beam-form said signals, and wherein each of the plurality of antenna arrays transmits a plurality of different data streams in parallel with each other at said frequency, wherein both of the plurality of individual antennas and the plurality of antenna arrays are arranged in particular physical patterns that impart beam-forming characteristics that minimize interference between the parallel plurality of different data streams; and
a plurality of receivers for receiving said radio frequency signals from the antenna array.

7. The communication system of claim 6, wherein said plurality of individual antennas all operate at approximately the same frequency.

8. The communication system of claim 6, wherein said frequency is in a 60 GHz band.

9. The communication system of claim 6, wherein said plurality of antenna arrays are printed on a substrate of a circuit board.

10. The communication system of claim 9, the plurality of individual antennas that comprises the plurality of antenna arrays are printed on the substrate approximately ½ wavelengths apart.

11. The communication system of claim 6, wherein said plurality of receivers comprises a plurality of receiving arrays corresponding to each of said plurality of individual antennas.

12. The communication system of claim 6, wherein the plurality of different data streams comprise a plurality of radio frequency signals that have been encoded with data that is different from each of the other plurality of different data streams.

13. A method of communicating comprising:
printing a plurality of antenna arrays on a substrate attached to a semiconductor portion of an integrated circuit, wherein each of the plurality of antenna arrays is comprised of a plurality of individual antennas, wherein both of the plurality of individual antennas and the plurality of antenna arrays are arranged in particular physical patterns;
receiving an incoming data stream that has been divided into a plurality of different data streams corresponding to the plurality of individual antenna arrays; and
transmitting radio frequency signals encoded with the plurality of different data streams from each of the plurality of antenna arrays in parallel with a common phase and at a frequency of between approximately 57 GHz and 95 GHz, wherein the particular physical patterns in which the plurality of individual antennas and the plurality of antenna arrays are arranged impart beam-forming characteristics that minimize interference between the parallel plurality of different data streams.

14. The method of claim 13, wherein transmitting radio frequency signals comprises transmitting radio frequency signals from the plurality of individual antennas at approximately the same frequency.

15. The method of claim 13, wherein transmitting radio frequency signals comprises transmitting radio frequency signals in a 60 GHz band.

16. The method of claim 13, wherein printing the plurality of antenna arrays comprises printing the plurality of antenna arrays directly on an integrated circuit.

17. The method of claim 13, the plurality of individual antennas that comprises the plurality of antenna arrays are printed on the substrate approximately ½ wavelengths apart.

18. The method of claim 13, wherein the plurality of different data streams comprise a plurality of radio frequency signals that have been encoded with data that is different from each of the other plurality of different data streams.

19. A method of communicating comprising:
printing a plurality of antenna arrays on an integrated circuit packaging, wherein each of said plurality of antenna arrays is comprised of a plurality of individual antennas, wherein both of the plurality of individual antennas and the plurality of antenna arrays are arranged in particular physical patterns; and
transmitting a plurality of different data streams from each of said plurality of antenna arrays in parallel with each other at a common phase and at a frequency of between approximately 57 GHz and 95 GHz, wherein the particular physical patterns in which the plurality of individual antennas and the plurality of antenna arrays are arranged impart beam-forming characteristics that minimize interference between the parallel plurality of different data streams.

20. The method of claim 19, wherein transmitting radio frequency signals comprises transmitting radio frequency signals from each of said plurality of antenna arrays in parallel at approximately the same frequency.

21. The method of claim 19, wherein transmitting radio frequency signals comprises transmitting radio frequency signals in a 60 GHz band.

22. The method of claim 19, wherein printing the plurality of antenna arrays comprises printing the plurality of antenna arrays on the integrated circuit package.

23. The method of claim 19, wherein the plurality of individual antennas that comprises the plurality of antenna arrays are printed on the integrated circuit packaging approximately ½ wavelengths apart.

24. The method of claim 19, wherein the plurality of different data streams comprise a plurality of radio frequency signals that have been encoded with data that is different from each of the other plurality of different data streams.

25. A super-array printed on a substrate attached to a semiconductor portion of an integrated circuit, wherein the super-array comprises a plurality of individual beam-forming antenna arrays each of which comprises a plurality of antennas that generate directional radio frequency transmissions, wherein both the plurality of individual antennas and the plurality of antenna arrays are arranged in particular beam-forming physical patterns, wherein the super-array is to:
receive an incoming data stream that has been divided into a plurality of different data streams corresponding to the plurality of individual beam-forming antenna arrays, wherein the plurality of different data streams comprise a plurality of radio frequency signals that have been encoded with data that is different from each of the other plurality of different data streams, and
transmit directional radio frequency signals carrying the plurality of different data streams using each of the corresponding plurality of individual beam-forming antenna arrays, wherein the plurality of different data streams are transmitted in parallel, at a common phase and at a common frequency that is between approximately 57 GHz and 95 GHz, wherein the particular beam-forming physical patterns in which the plurality of individual antennas and the plurality of antenna arrays are arranged minimize interference between the parallel plurality of different data streams.

* * * * *